J. B. SMITH.
Coffee Pot.
No. 71,236.
Patented Nov. 19, 1867.
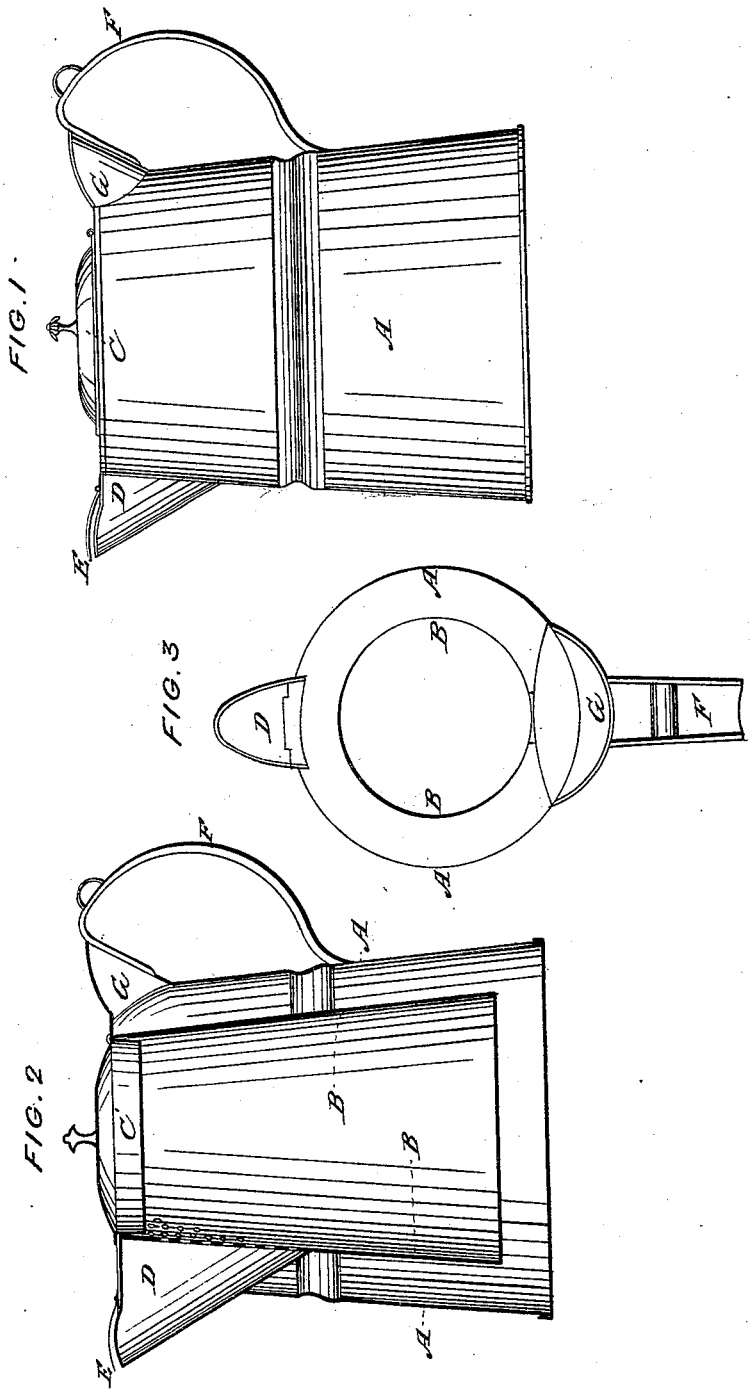
WITNESSES:
INVENTOR:

United States Patent Office.

J. B. SMITH, OF MILWAUKEE, WISCONSIN.

Letters Patent No. 71,236, dated November 19, 1867.

COFFEE-POTS.

The Schedule referred to in these Letters Patent and making part of the same.

TO ALL WHOM IT MAY CONCERN:

Be it known that I, J. B. SMITH, of the city and county of Milwaukee, and State of Wisconsin, have invented a new and useful Improvement in Coffee-Pots; and I do hereby declare that the following is a full, clear, and exact description thereof, which will enable those skilled in the art to make and use the same, reference being had to the accompanying drawing, forming part of this specification, in which—

Figure 1 is a perspective view,

Figure 2 a sectional view, and

Figure 3 top, with the cover and spout-lid removed.

Similar letters of reference in each of the figures indicate corresponding parts.

The object of my invention is to construct a coffee-pot, in which coffee can be made at all times, so as to retain the aroma of the berry, and this with certainty; and this I do by making a coffee-pot double, with a water-space between the outside and inside pot, so that when this water-space is filled or partly filled with water, it may boil without the coffee boiling in the inner pot.

A is the outside pot, B inside pot. This outside and inside pot are connected together by the covering of the space between them at the top, as shown in fig. 3, and also by the spout D. In the larger coffee-pots I put stays from the inner to the outer pot at the bottom. C, the cover of the inner pot; D, spout through which to pour the coffee; E, spout-lid; F, handle; G, spout, through which water is poured into and out from the space between the outer and inner pot.

Operation.

Put the coffee, burned and ground, as used, into pot B, and pour in the necessary amount of boiling water, close cover C and lid E. Then fill with boiling water the space between the pots half full, more or less, as you may like; pouring the water through spout G. Then set the pot on the stove or over the fire, when the water in the space may boil; the steam passing off through spout G. The water in the inner pot will not boil, but will be kept just at the boiling point. The vapor rising from it not having force enough to lift the lid or cover, the aroma of the coffee is all retained in the pot. When the coffee is made, it can be poured off through spout D without the water between the pots running out. The covering, which closes the space between them, keeps the water back. This water can be poured out (by tipping the coffee-pot the other way) through spout G.

What I claim as my invention, and desire to secure by Letters Patent, is—

A coffee-pot, consisting of the inner vessel B and the outer vessel A, with a water-space between them, united at their top by an annular plate, having an opening, G, at the rear side only for the introduction of water, substantially as described.

J. B. SMITH.

Witnesses:
J. WALLIS,
PERCY B. SMITH.